(12) United States Patent
Kobayashi

(10) Patent No.: US 10,185,081 B2
(45) Date of Patent: Jan. 22, 2019

(54) DISPLAY APPARATUS AND TELEVISION RECEIVING APPARATUS

(71) Applicant: Sakai Display Products Corporation, Sakai-shi, Osaka (JP)

(72) Inventor: Ryota Kobayashi, Sakai (JP)

(73) Assignee: Sakai Display Products Corporation, Sakai-shi, Osaka (JP)

(*) Notice: Subject to any disclaimer, the term of this patent is extended or adjusted under 35 U.S.C. 154(b) by 63 days.

(21) Appl. No.: 14/896,766

(22) PCT Filed: Jun. 10, 2014

(86) PCT No.: PCT/JP2014/065355
§ 371 (c)(1),
(2) Date: Dec. 8, 2015

(87) PCT Pub. No.: WO2014/199988
PCT Pub. Date: Dec. 18, 2014

(65) Prior Publication Data
US 2016/0116661 A1    Apr. 28, 2016

(30) Foreign Application Priority Data
Jun. 13, 2013 (JP) .................................. 2013-124907

(51) Int. Cl.
*G02F 1/1333*   (2006.01)
*G02B 6/02*     (2006.01)
(Continued)

(52) U.S. Cl.
CPC ........... *G02B 6/009* (2013.01); *G02B 6/0068* (2013.01); *G02B 6/0073* (2013.01);
(Continued)

(58) Field of Classification Search
USPC ....... 348/558, 563, 569, 553, 725, 729, 751, 348/790, 731, 791, 794, 836, 843, 823,
(Continued)

(56) References Cited

U.S. PATENT DOCUMENTS 5,341,231 A * 8/1994 Yamamoto ............. G02B 6/003
349/63
6,992,718 B1 * 1/2006 Takahara ............... G02B 23/14
348/333.09
(Continued)

FOREIGN PATENT DOCUMENTS

JP    2008-020557 A    1/2008
JP    2011-216270 A    10/2011
(Continued)

*Primary Examiner* — Brian P Yenke
*Assistant Examiner* — Mustafizur Rahman
(74) *Attorney, Agent, or Firm* — Rudy J. Ng; Bret E. Field; Bozicevic, Field & Francis LLP

(57) ABSTRACT

A display apparatus includes a display panel having a display surface on one surface thereof, a light guide plate disposed on the other surface side of the display panel, a substrate on which a plurality of light source elements disposed to face an end face of the light guide plate are mounted on one surface thereof, a support plate for supporting the substrate, and a frame body for covering a peripheral edge part of the display panel and the support plate, wherein the frame body and support plate have holes formed at positions thereof facing the end face, and the substrate has an insertion hole into which any one tip part of a screw or a clip fitted into the holes is inserted.

7 Claims, 9 Drawing Sheets

(51) Int. Cl.
*F21V 8/00* (2006.01)
*H04N 5/445* (2011.01)
*H04N 21/426* (2011.01)
*H04N 21/431* (2011.01)
*H04N 21/485* (2011.01)
*H04N 5/64* (2006.01)

(52) U.S. Cl.
CPC ..... *G02B 6/0088* (2013.01); *G02F 1/133308* (2013.01); *H04N 5/445* (2013.01); *H04N 21/42653* (2013.01); *H04N 21/4312* (2013.01); *H04N 21/485* (2013.01); *G02F 2001/13332* (2013.01); *G02F 2001/133314* (2013.01); *G02F 2001/133317* (2013.01); *G02F 2001/133331* (2013.01); *H04N 5/64* (2013.01)

(58) Field of Classification Search
USPC ........ 348/439.1, 333.03; 349/58, 61, 62, 63, 349/65; 362/600, 606, 611, 612, 613, 362/615, 633, 289
See application file for complete search history.

(56) References Cited

U.S. PATENT DOCUMENTS

| | | | | |
|---|---|---|---|---|
| 7,489,371 B2* | 2/2009 | Yamamoto | ........ | G02F 1/133308 349/58 |
| 9,001,112 B2* | 4/2015 | Choi | ........ | H04N 5/64 345/214 |
| 9,128,231 B2* | 9/2015 | Tomomasa | ........ | G02F 1/133308 |
| 9,684,123 B2* | 6/2017 | Horiguchi | ........ | G02B 6/0088 |
| 9,904,084 B2* | 2/2018 | Sugimoto | ........ | G02F 1/133308 |
| 2005/0052619 A1* | 3/2005 | Kitabayashi | ........ | G03B 21/005 353/31 |
| 2007/0188673 A1* | 8/2007 | Nishio | ........ | G02B 6/0083 349/58 |
| 2007/0210694 A1* | 9/2007 | Kim | ........ | G02F 1/133608 313/493 |
| 2010/0073959 A1 | 3/2010 | Hamada | | |
| 2010/0195351 A1* | 8/2010 | Ueyama | ........ | G02B 6/0068 362/613 |
| 2011/0285937 A1 | 11/2011 | Onoue et al. | | |
| 2012/0087122 A1* | 4/2012 | Takeuchi | ........ | G02F 1/133603 362/235 |
| 2012/0236228 A1 | 9/2012 | Tang | | |
| 2012/0249886 A1 | 10/2012 | Kuromizu | | |
| 2012/0314138 A1* | 12/2012 | Takata | ........ | G02B 6/003 348/725 |
| 2013/0044271 A1* | 2/2013 | Momose | ........ | G02F 1/133615 349/58 |
| 2014/0037351 A1* | 2/2014 | Matsui | ........ | G03G 15/50 399/389 |
| 2014/0111706 A1* | 4/2014 | Nakamura | ........ | H04N 5/64 348/843 |
| 2014/0125877 A1* | 5/2014 | Nakamura | ........ | H04N 5/64 348/843 |
| 2014/0132848 A1* | 5/2014 | Mouri | ........ | G02B 6/009 348/801 |
| 2014/0168727 A1* | 6/2014 | Kawamura | ........ | H04N 1/19 358/482 |
| 2014/0184929 A1* | 7/2014 | Nakamura | ........ | G02F 1/133308 348/836 |
| 2014/0226072 A1* | 8/2014 | Ikuta | ........ | G02B 6/0081 348/725 |
| 2014/0226081 A1* | 8/2014 | Tomomasa | ........ | G02F 1/133308 348/794 |
| 2014/0232942 A1* | 8/2014 | Yahata | ........ | H04N 5/64 348/725 |
| 2014/0232945 A1* | 8/2014 | Uno | ........ | G02F 1/133615 348/739 |
| 2014/0232969 A1* | 8/2014 | Tsubaki | ........ | G02F 1/133308 349/58 |
| 2014/0240606 A1* | 8/2014 | Tomomasa | ........ | G02F 1/133308 348/725 |
| 2014/0307175 A1* | 10/2014 | Oka | ........ | H04N 5/64 348/790 |
| 2014/0313733 A1* | 10/2014 | Takeuchi | ........ | G02F 1/133603 362/296.01 |
| 2014/0327857 A1* | 11/2014 | Ito | ........ | G02F 1/133308 349/58 |
| 2014/0333844 A1* | 11/2014 | Ito | ........ | H04N 5/64 348/794 |
| 2014/0340586 A1* | 11/2014 | Terashima | ........ | G02B 6/0055 348/790 |
| 2014/0368744 A1* | 12/2014 | Ichiza | ........ | G02F 1/133615 348/731 |
| 2014/0375891 A1* | 12/2014 | Hosoki | ........ | G02F 1/133308 348/725 |
| 2015/0015798 A1* | 1/2015 | Masuda | ........ | G02F 1/1333 348/794 |
| 2015/0042898 A1* | 2/2015 | Ikuta | ........ | G02F 1/133308 348/790 |
| 2015/0042899 A1* | 2/2015 | Tomomasa | ........ | G02F 1/133308 348/790 |
| 2015/0055026 A1* | 2/2015 | Ikuta | ........ | H04N 5/64 348/791 |
| 2015/0078032 A1* | 3/2015 | Horiguchi | ........ | G02F 1/133308 362/607 |
| 2015/0116598 A1* | 4/2015 | Myojo | ........ | G02F 1/133308 348/725 |
| 2015/0219954 A1* | 8/2015 | Kubo | ........ | G02F 1/133308 348/794 |
| 2015/0226996 A1* | 8/2015 | Ohashi | ........ | G02B 6/0011 348/725 |
| 2015/0248035 A1* | 9/2015 | Kubo | ........ | H04N 5/44 348/725 |
| 2015/0277179 A1* | 10/2015 | Nishi | ........ | G02B 6/0088 349/58 |
| 2015/0341587 A1* | 11/2015 | Chikazawa | ........ | G02B 6/0091 348/725 |
| 2015/0373857 A1* | 12/2015 | Chikazawa | ........ | H04N 5/64 348/726 |
| 2016/0054516 A1* | 2/2016 | Horiguchi | ........ | G02F 1/133308 348/790 |
| 2016/0102847 A1* | 4/2016 | Gotou | ........ | G02B 6/009 348/790 |
| 2016/0131828 A1* | 5/2016 | Gotou | ........ | G02F 1/1333 348/790 |
| 2016/0259202 A1* | 9/2016 | Sugimoto | ........ | G02F 1/133308 |

FOREIGN PATENT DOCUMENTS

| | | |
|---|---|---|
| JP | 2011-243486 A | 12/2011 |
| WO | WO2008090646 A1 | 7/2008 |
| WO | WO2011074354 A1 | 6/2011 |
| WO | WO2012165318 A1 | 12/2012 |

* cited by examiner

F I G. 3
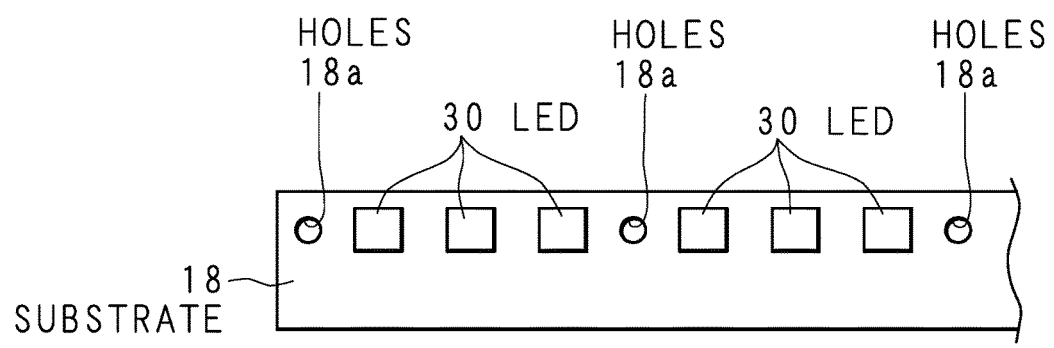

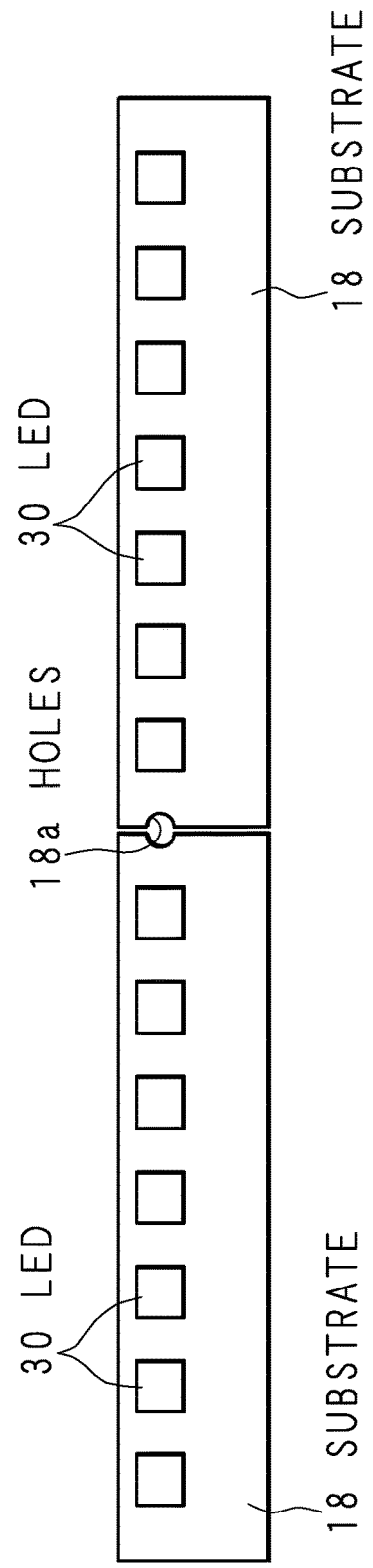

DISPLAY APPARATUS AND TELEVISION RECEIVING APPARATUS

CROSS-REFERENCE TO RELATED APPLICATIONS

This application is the national phase under 35 U.S.C. § 371 of PCT International Application No. PCT/JP2014/065355 which has an International filing date of Jun. 10, 2014 and designated the United States of America.

BACKGROUND

The present invention relates to a display apparatus which includes a display panel and a backlight, and a television receiving apparatus including the display apparatus.

DESCRIPTION OF THE RELATED ART

A liquid crystal display apparatus includes a liquid crystal display panel having a display surface on a front surface thereof, a backlight and the like. As the backlight, for example, there is an edge light type backlight which includes a light guide plate disposed on a rear surface side of a liquid crystal panel through optical sheets, light emitting diodes (LEDs) disposed to face an end face of the light guide plate and the like. Light emitted from the LEDs is made incident inside of the light guide plate from the end face of the light guide plate, and is made incident inside of the liquid crystal display panel from the rear surface side of the liquid crystal display panel through the light guide plate.

As such the liquid crystal display apparatus, a backlight unit, which includes a light guide plate which emits light made incident thereon from LEDs in a planar shape from an upper surface thereof, a substrate which is disposed along an end face of the light guide plate and has the LEDs mounted on a facing surface which faces the end face, a frame which is disposed along the substrate and is attached to the substrate from a rear surface side of the facing surface, and insulation members which are disposed so as to sandwich the substrate between the same and the frame, wherein a screw tip of a screw which is inserted from the frame side is fixed to a through hole provided in the frame and the substrate by the insulation members, has been disclosed (see Japanese Patent Application Laid-open No. 2011-243486).

SUMMARY OF THE INVENTION

However, the liquid crystal display apparatus of Japanese Patent Application Laid-open No. 2011-243486 has a configuration in which the frame has a first plate-shaped portion which is fixed to a chassis, and a second plate-shaped portion which is attached to the substrate, wherein the first plate-shaped portion extends toward an outside, such that a distance between the end face of the light guide plate and an outer shell of the chassis is increased. Therefore, it is preferable that the liquid crystal display apparatus has a structure which further narrows a frame.

In addition, since the liquid crystal display apparatus of Japanese Patent Application Laid-open No. 2011-243486 requires the insulation member for fixing the substrate and the frame, component costs are increased.

In consideration of the above-mentioned circumstances, it is an object of the present invention to provide a display apparatus capable of narrowing a frame, and a television receiving apparatus including the display apparatus.

A display apparatus according to the present invention includes a display panel having a display surface on one surface thereof, a light guide plate disposed on the other surface side of the display panel, a substrate on which a plurality of light source elements disposed to face an end face of the light guide plate are mounted on one surface thereof, a support plate configured to support the substrate, and a frame body configured to cover a peripheral edge part of the display panel and the support plate, wherein the frame body and the support plate has a hole which is formed at position facing the end face of the light guide plate, and the substrate has an insertion hole into which any one tip part of a screw or a clip which is fitted into the hole is inserted.

The display apparatus according to the present invention, the tip part is disposed between the insertion hole and the end face of the light guide plate.

The display apparatus according to the present invention, the tip part abuts the end face of the light guide plate.

The display apparatus according to the present invention, a protruding dimension of the tip part from one surface of the substrate is longer than a height dimension of the light source element from the one surface.

The display apparatus according to the present invention, a plurality of light source elements are arranged side by side, and the insertion hole is disposed on a virtual line segment connecting the light source elements.

A television receiving apparatus according to the present invention includes the display apparatus according to the present invention and a receiving unit configured to receive a signal of television broadcasts, wherein the display apparatus is configured to display an image thereon based on the signal of television broadcasts received by the receiving unit.

The above and further objects and features will more fully be apparent from the following detailed description with accompanying drawings.

According to the present invention, it is possible to narrow a frame.

BRIEF DESCRIPTION OF THE DRAWINGS

FIG. 3 is a plan view illustrating an example of a configuration of a substrate of Embodiment 1.

FIG. 9 is a plan view illustrating an example of a configuration of a substrate of Embodiment 6.

DETAILED DESCRIPTION

Embodiment 1

Figure 1:
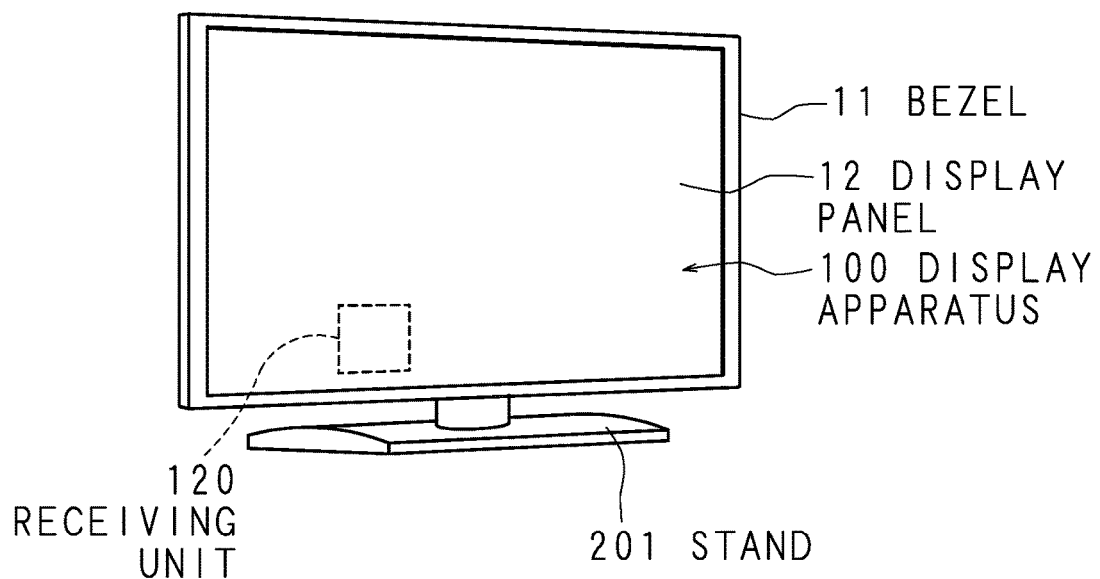
FIG. 1 is an external perspective view illustrating an example of a configuration of a television receiving apparatus of Embodiment 1.

Hereinafter, the present invention will be described in detail with reference to the accompanying drawings illustrating embodiments thereof. FIG. 1 is an external perspective view illustrating an example of a configuration of a television receiving apparatus 200 of Embodiment 1. The television receiving apparatus 200 includes a display apparatus 100, a receiving unit 120 which receives a signal of television broadcasts, a stand 201 and the like. The display apparatus 100 displays an image based on the signal of television broadcasts received by the receiving unit 120. In addition, the display apparatus 100 includes a display panel 12 which is a rectangular liquid crystal panel and has one surface to be a display surface, a bezel 11 as a frame body for covering a peripheral edge part of the display panel 12 and the like. Hereinafter, the display apparatus 100 will be described in detail.

Figure 2:
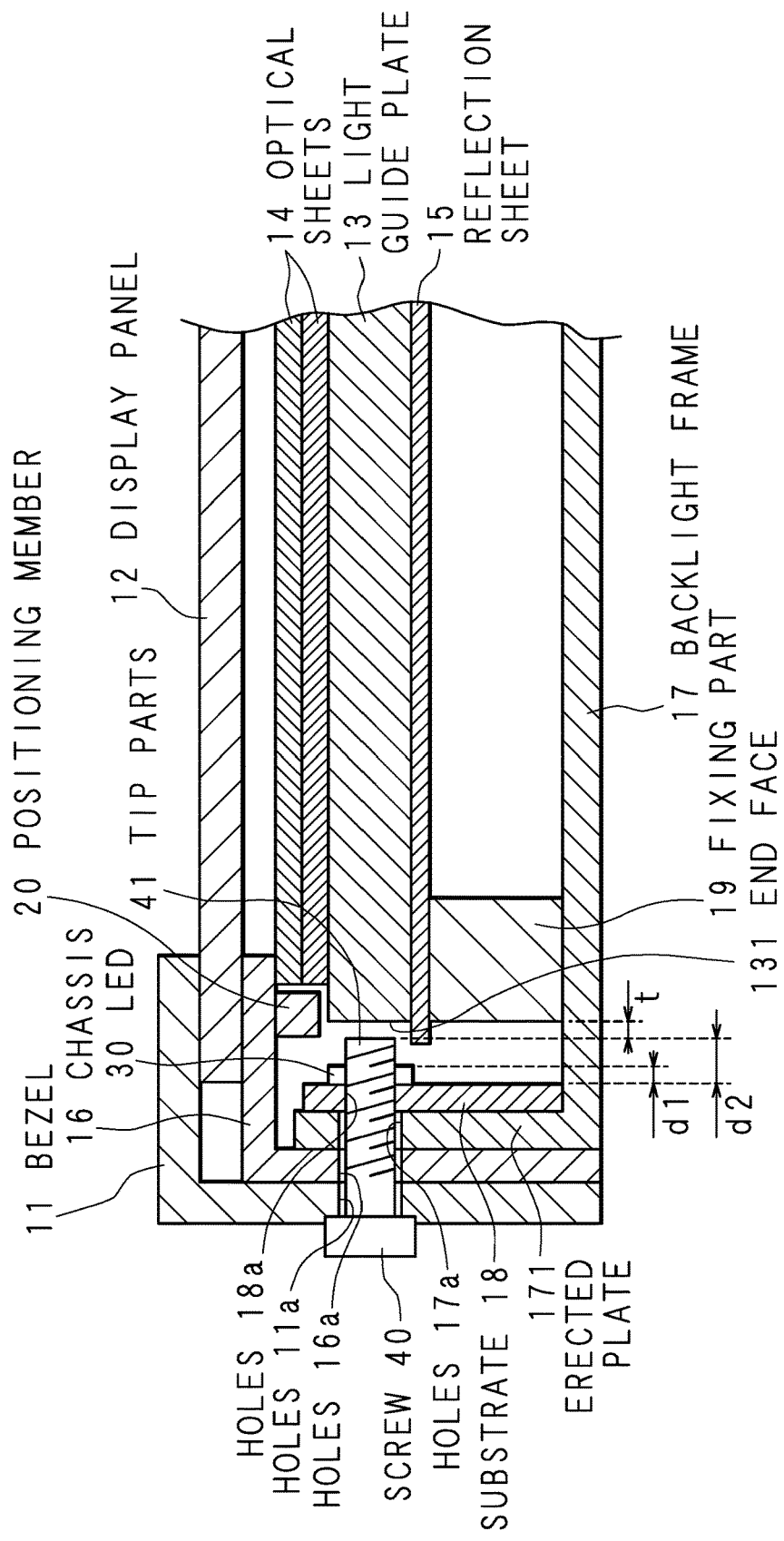
FIG. 2 is a cross-sectional view illustrating main components of a display apparatus of Embodiment 1.

FIG. 2 is a cross-sectional view illustrating main components of the display apparatus 100 of Embodiment 1, and FIG. 3 is a plan view illustrating an example of a configuration of a substrate 18 of Embodiment 1. As illustrated in FIG. 2, the display apparatus 100 includes the display panel 12 having the display surface on one surface (front surface) thereof, a light guide plate 13 which is disposed on the other surface side (rear surface side) of the display panel, a substrate 18 on which a plurality of LEDs 30 as a light source element disposed to face an end face 131 of the light guide plate 13 are mounted on one surface thereof, a backlight frame 17 which abuts the other surface of the substrate 18 to support the substrate 18 as a support plate, a bezel 11 which covers the peripheral edge part of the display panel 12 and a side surface of the backlight frame 17 and the like.

The display panel 12 has a pair of glass substrates on the one surface (front surface) and the other surface (rear surface) thereof, and a liquid crystal material sealed between the pair of glass substrates. Herein, by applying a voltage to a driver for driving each pixel of the display panel 12, the transmittance of light which is determined by electro-optical characteristics of the liquid crystal material may be changed, and by controlling an amount of light transmitting through the display panel 12 for each pixel, an image with gradations may be displayed.

In the present embodiment, the backlight employs a so-called edge light type, and includes the LED 30, the substrate 18 on which the LED 30 is mounted, the light guide plate 13, optical sheets 14 disposed on a light emitting surface of the light guide plate 13, a reflection sheet 15 disposed on a surface of a side opposite to the light emitting surface of the light guide plate 13 and the like.

The light guide plate 13 is formed in a rectangular shape, and has vertical and horizontal dimensions substantially the same as those of the display panel 12. A material of the light guide plate 13 may be an acrylic resin, a polycarbonate resin, or the like, but it is not limited thereto.

The optical sheets 14 are formed in a rectangular shape having slightly smaller dimensions than those of the display panel 12. The optical sheets 14 are a sheet in which one or a plurality of optical sheets each having a light diffusion function and/or a light collection function are laminated.

The reflection sheet 15 are formed in a rectangular shape having slightly larger dimensions than those of the light guide plate 13. The reflection sheet 15 reflects light emitted from a back surface (rear surface) of the light guide plate 13 to again become incident inside of the light guide plate 13.

As illustrated in FIG. 3, the substrate 18 is formed in an elongated shape, and has the plurality of LEDs 30 which are arranged side by side thereon at a proper interval. That is, the plurality of LEDs 30 are linearly disposed in a longitudinal direction of the substrate 18. Further, the number of the LEDs 30 is an example, and it is not limited to the example illustrated in FIG. 3. When providing one substrate 18 to face the end face 131 of the light guide plate 13, a length of the substrate 18 is substantially equal to the vertical or horizontal dimension of the light guide plate 13, for example. In addition, when disposing a plurality of substrates 18 to face the end face 131 by arranging in the longitudinal direction, a total of lengths of the plurality of substrates 18 is substantially equal to the vertical or horizontal dimension of the light guide plate 13.

The light emitted from the LEDs 30 is made incident on the end face 131 of the light guide plate 13. The light made incident on the light guide plate 13 is emitted from the light emitting surface thereof, and is diffused and collected by the optical sheets 14 to become incident inside of the display panel 12 from the rear surface of the display panel 12. Thereby, the display surface of the display panel 12 has a uniform brightness.

The backlight frame 17 has vertical and horizontal dimensions substantially the same as those of the display panel 12, and has an erected plate 171 as a support plate which is erected by bending the peripheral edge part thereof in a substantially L shape. The erected plate 171 has a height dimension substantially the same as the width dimension of the substrate 18. An inner surface of the erected plate 171 abuts the other surface of the substrate 18, and the erected plate 171 supports the substrate 18.

In addition, the backlight frame 17 has a fixing part 19 which supports the light guide plate 13 to be fixed thereto. Further, a backside of the backlight frame 17 is covered by a housing such as a cabinet (not illustrated).

A chassis 16 having a substantially L-shaped cross-section is provided on an outer surface of the erected plate 171. The chassis 16 covers the LED 30 to prevent the LED 30 from being directly viewed from the display surface of the display panel 12.

The chassis 16 is provided with a positioning member 20 which is formed inside thereof to regulate a movement of the optical sheets 14 and position the optical sheets 14.

The bezel 11 has a cross-section formed in a substantially L shape, and is disposed to cover the peripheral edge part of the display panel 12 and cover the erected plate 171 of the backlight frame 17 through the chassis 16.

Each of the bezel 11, the chassis 16, and the erected plate 171 has screw holes 11a, 16a and 17a formed therein as a hole for fastening screws 40 at positions facing the end face 131 of the light guide plate 13. The screw hole 17a is adapted to be screwed with the screw 40. Thereby, by fastening the screw 40, it is possible to fix the bezel 11 and the backlight frame 17 to each other. Further, the example of FIG. 2 has a configuration in which the screw holes 11a, 16a and 17a are formed corresponding to the screws 40, but it is not limited thereto. For example, instead of the screw 40, it is possible to use a member such as a clip, pin, rivet, or the like which is fitted into the hole. In addition, when using such the member, instead of the screw hole, it is possible to provide a hole (hole which is not threaded) into which the clip, pin, rivet, or the like is fitted.

As illustrated in FIG. 3, the substrate 18 has insertion holes 18a for inserting tip parts 41 of the screws 40 which are fastened into the screw hole 17a. As illustrated in FIG. 3, the insertion holes 18a and the LEDs 30 are arranged side by side each other. That is, the plurality of LEDs 30 are arranged side by side, and the insertion holes 18a are disposed on a virtual line segment connecting the LEDs 30. Further, the insertion holes 18a may be disposed on the line of the LEDs 30 which are disposed in a line shape, or may be disposed in the vicinity of the line. By arranging the insertion holes 18a and the LEDs 30 in a line, the width dimension of the substrate 18 may be minimized, and thinning of display apparatus 100 may be achieved.

Since the screw 40 is adapted so that the tip part 41 thereof is inserted into the insertion holes 18a of the substrate 18, even when employing a so-called thin and narrow frame structure having a small dimension between the LED 30 and the bezel 11, it is possible to prevent the screw 40 from being interfered with the substrate 18. In addition, since the interference between the screw 40 and the substrate 18 can be prevented, it is possible to fix the bezel 11 and the backlight frame 17 to each other, and narrow the frame.

In addition, the tip part 41 of the screw 40 is disposed between the insertion holes 18a and the end face 131 of the light guide plate 13. In more detail, as illustrated in FIG. 2, a gap illustrated by a symbol t is provided between the tip part 41 of the screw 40 and the end face 131 of the light guide plate 13. Thereby, when the light guide plate 13 is fixed to a prescribed position by a pin (not illustrated), or the like, if the light guide plate 13 is expanded in longitudinal and lateral directions due to heat inside of the display apparatus 100, it is possible to provide an allowance capable of allowing a small expansion. In addition, when the light guide plate 13 is further expanded, the end face 131 of the light guide plate 13 is regulated by the tip part 41 of the screw 40, such that it is possible to suppress the expansion of the light guide plate 13.

Further, as illustrated in FIG. 2, a protruding dimension of the tip part 41 of the screw 40 from one surface of the substrate 18 (a dimension illustrated by a symbol d2 in FIG. 2) is longer than the height dimension of the LED 30 from the one surface of the substrate 18 (a dimension illustrated by a symbol d1 in FIG. 2) (d2>d1). Thereby, when the light guide plate 13 is thermally expanded, it is possible to prevent the LED 30 from being damaged or destroyed due to the end face 131 of the light guide plate 13 contacting or pressing the LED 30. In addition, since the screw 40 is also used as a member for suppressing the thermal expansion of the light guide plate 13, it is possible to achieve a decrease in component costs, without requiring a separate member for suppressing the thermal expansion of the light guide plate 13.

In the present embodiment, the screw 40 generally has a tolerance of about +0/−0.5 mm. For example, when setting a spaced dimension between the LED 30 and the end face 131 to be 1.8 mm, and the height dimension of the LED 30 to be 0.8 mm, a design value of the protruding dimension d2 of the tip part 41 of the screw 40 from one surface of the substrate 18 may be set within a range of 1.3 mm to 1.8 mm. In the present embodiment, since the LED 30 and the end face 131 of the light guide plate 13 can be brought close to each other, it is possible to improve an efficiency of light made incident on the light guide plate 13 from the LED 30. In addition, unlike components generally being distributed in commerce, by performing dimensional control of the screw 40 using a component with a raised precision, the LED 30 and the end face 131 of the light guide plate 13 can further be brought close to each other, and thereby it is possible to more improve the light incident efficiency.

The screw 40 for fixing the bezel 11 and the backlight frame 17 is not limited to the shape exemplified in FIG. 2, and it is possible to employ a fastener having a proper shape such as a screw or a bolt. In addition, it is also possible to substitute the screw by a fastener for fitting such as a rivet, such that the fastener corresponds to the screw 40 of the present embodiment.

Embodiment 2

Figure 4:
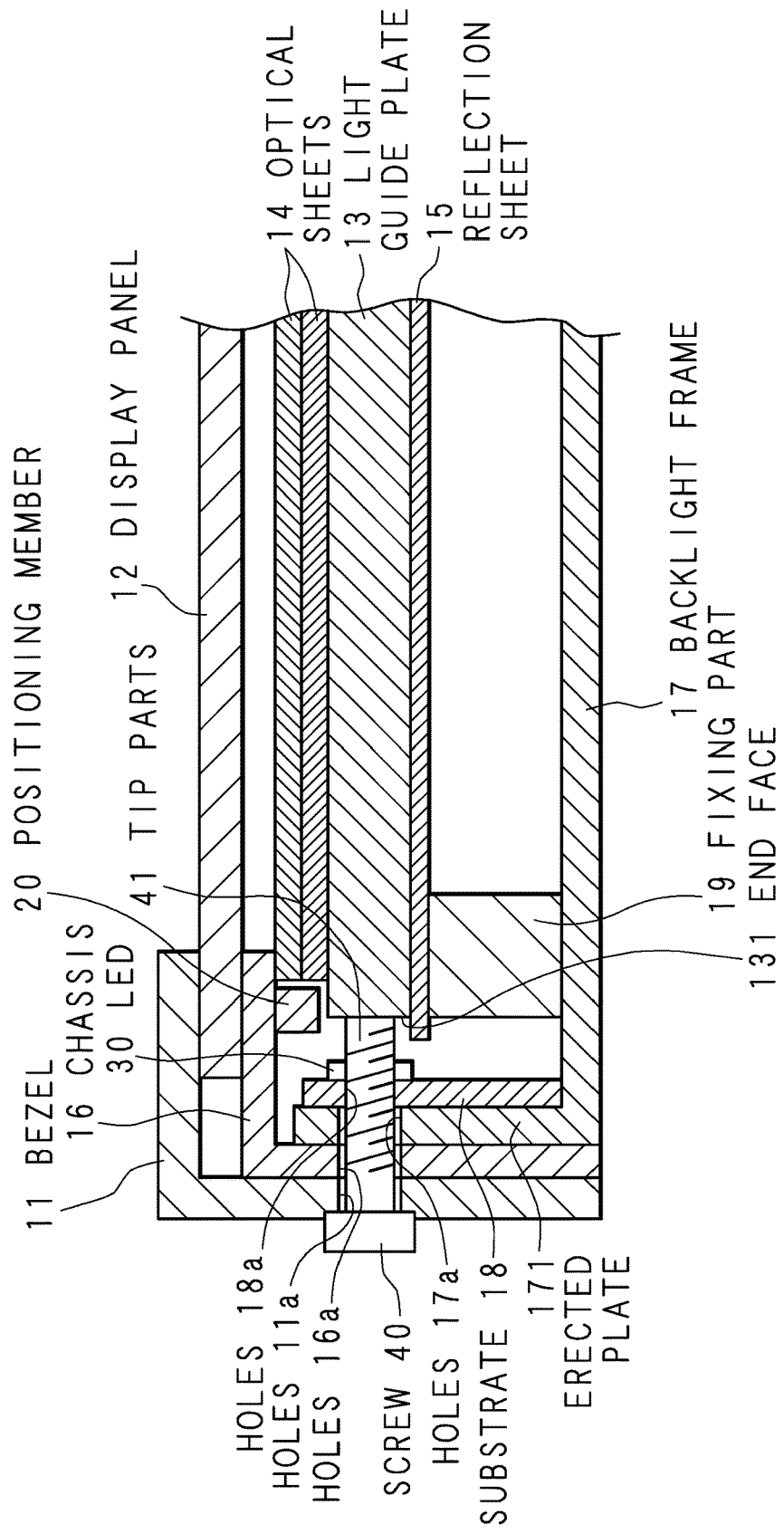
FIG. 4 is a cross-sectional view illustrating main components of a display apparatus of Embodiment 2.

FIG. 4 is a cross-sectional view illustrating main components of a display apparatus 110 of Embodiment 2. The difference from Embodiment 1 is that, as illustrated in FIG. 4, the tip part 41 of the screw 40 is disposed between the insertion holes 18a and the end face 131 of the light guide plate 13, but the tip part 41 of the screw 40 abuts the end face 131 of the light guide plate 13. That is, the gap t of the example in FIG. 2 is set to be 0.

For example, the display apparatus may be made as one side edge model in which the substrate 18 is disposed only on the inside of the bezel 11 of a lower side, among the bezels 11 formed of four top, bottom, left and right sides as exemplified in FIG. 1. In addition, the rectangular light guide plate 13 is also formed of four top, bottom, left and right sides. That is, the display apparatus has a structure in which the lower side of the light guide plate 13 and the substrate 18 are disposed parallel to each other.

Further, in this case, the tip part 41 of the screw 40 which is inserted into the insertion holes 18a of the substrate 18 abuts the end face 131 on a lower side of the light guide plate 13, such that the light guide plate 13 is supported by the screw 40 from the lower side. That is, the tip part 41 of the screw 40 abuts the end face 131 of the light guide plate 13, and thereby the screw 40 supports the light guide plate 13 from the lower side, such that a pin (not illustrated) for fixing the light guide plate 13, which is required in Embodiment 1 as exemplified in FIG. 2, is unnecessary. Briefly, in Embodiment 2, since the screw 40 also functions as a pin for fixing the light guide plate 13, the pin is unnecessary.

Further, in Embodiment 2, by providing a proper gap between the end face on an upper side of the light guide plate 13 and an inner surface of the bezel 11 on the upper side, if the light guide plate 13 is expanded in the longitudinal direction due to the heat inside of the display apparatus 100, it is possible to provide an allowance capable of allowing a small expansion.

Embodiment 3

Figure 5:
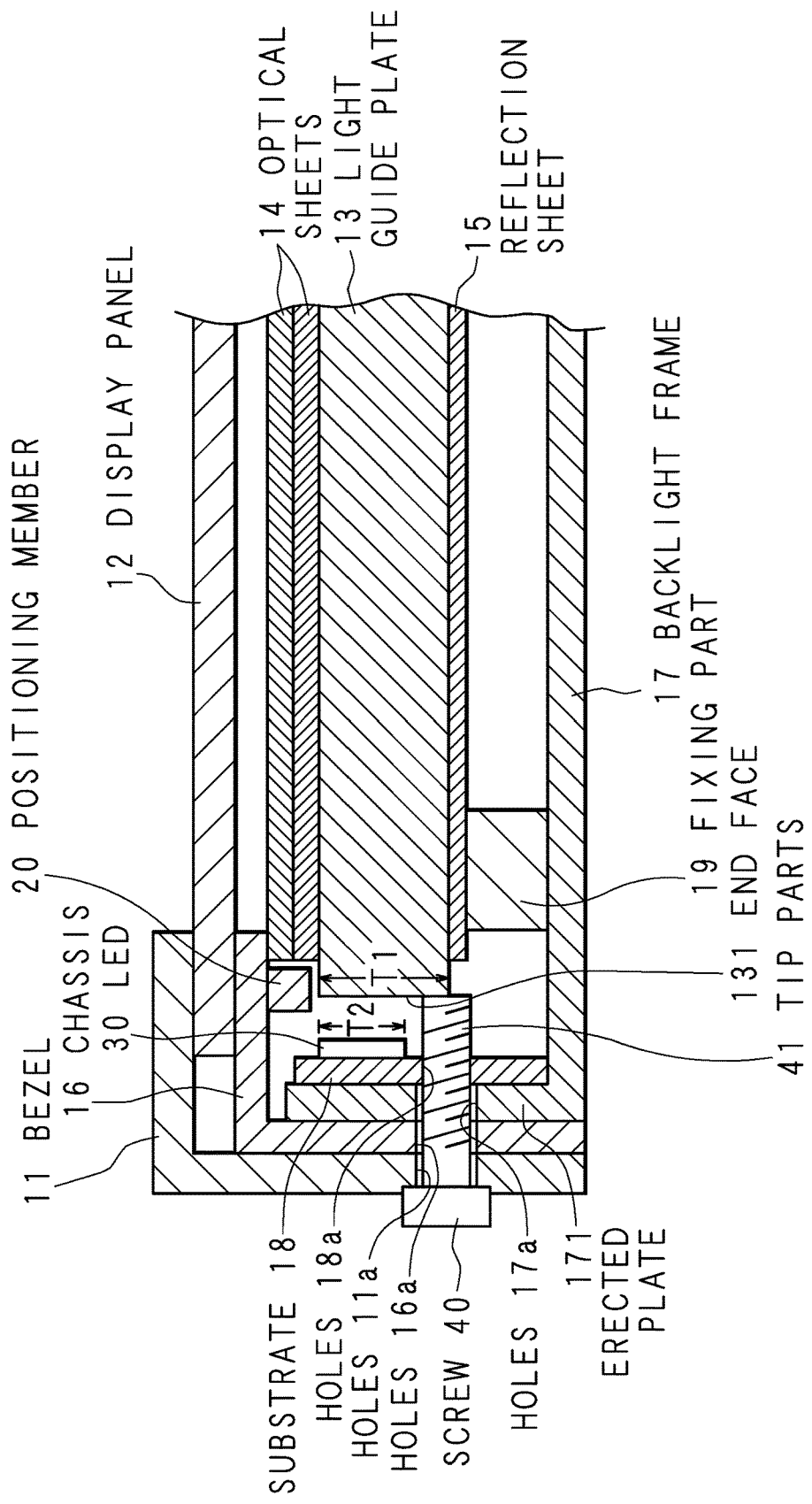
FIG. 5 is a cross-sectional view illustrating main components of a display apparatus of Embodiment 3.
Figure 6:
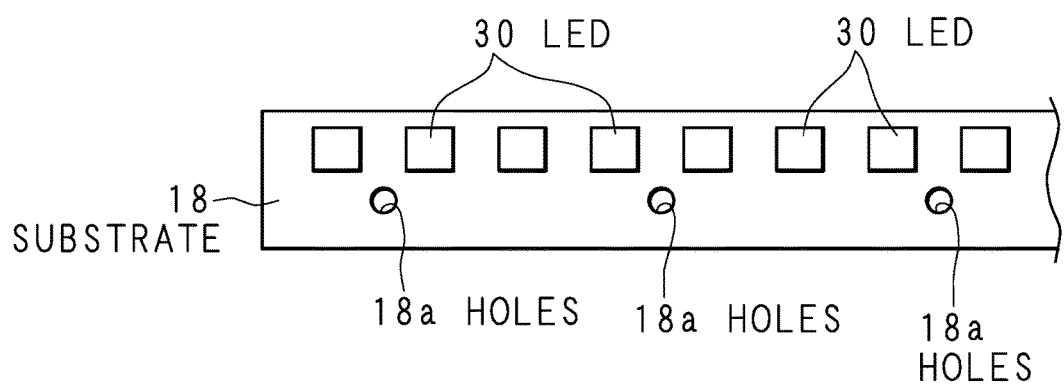
FIG. 6 is a plan view illustrating an example of a configuration of a substrate of Embodiment 3.

FIG. 5 is a cross-sectional view illustrating main components of a display apparatus 120 of Embodiment 3, and FIG. 6 is a plan view illustrating an example of a configuration of a substrate 18 of Embodiment 3. The difference from Embodiment 2 is the position of insertion holes 18a formed in the substrate 18. That is, the difference is that the insertion holes 18a for inserting the tip parts 41 of the screws 40 are arranged side by side so as to be parallel to the LEDs 30 disposed in a line (line shape).

As illustrated in FIG. 5, when the thickness dimension of the light guide plate 13 (a dimension illustrated by a symbol T1 in FIG. 5) is larger than the length dimension of the LED 30 (a dimension illustrated by a symbol T2 in FIG. 5, which is the dimension of light guide plate 13 in a thickness direction thereof) (T2>T1), a lower part of the end face 131 of the light guide plate 13 abuts the tip part 41 of the screw 40, such that the thermal expansion of the light guide plate 13 may be regulated to prevent the LED 30 from being damaged or destroyed due to it contacting the end face 131 of the light guide plate 13.

In addition, the insertion holes 18a are arranged in parallel to the LEDs 30, and thereby it is possible to achieve a desired arrangement of the LEDs 30, without limiting an interval between the LEDs 30 by the presence of the insertion holes 18a.

Embodiment 4

Figure 7:
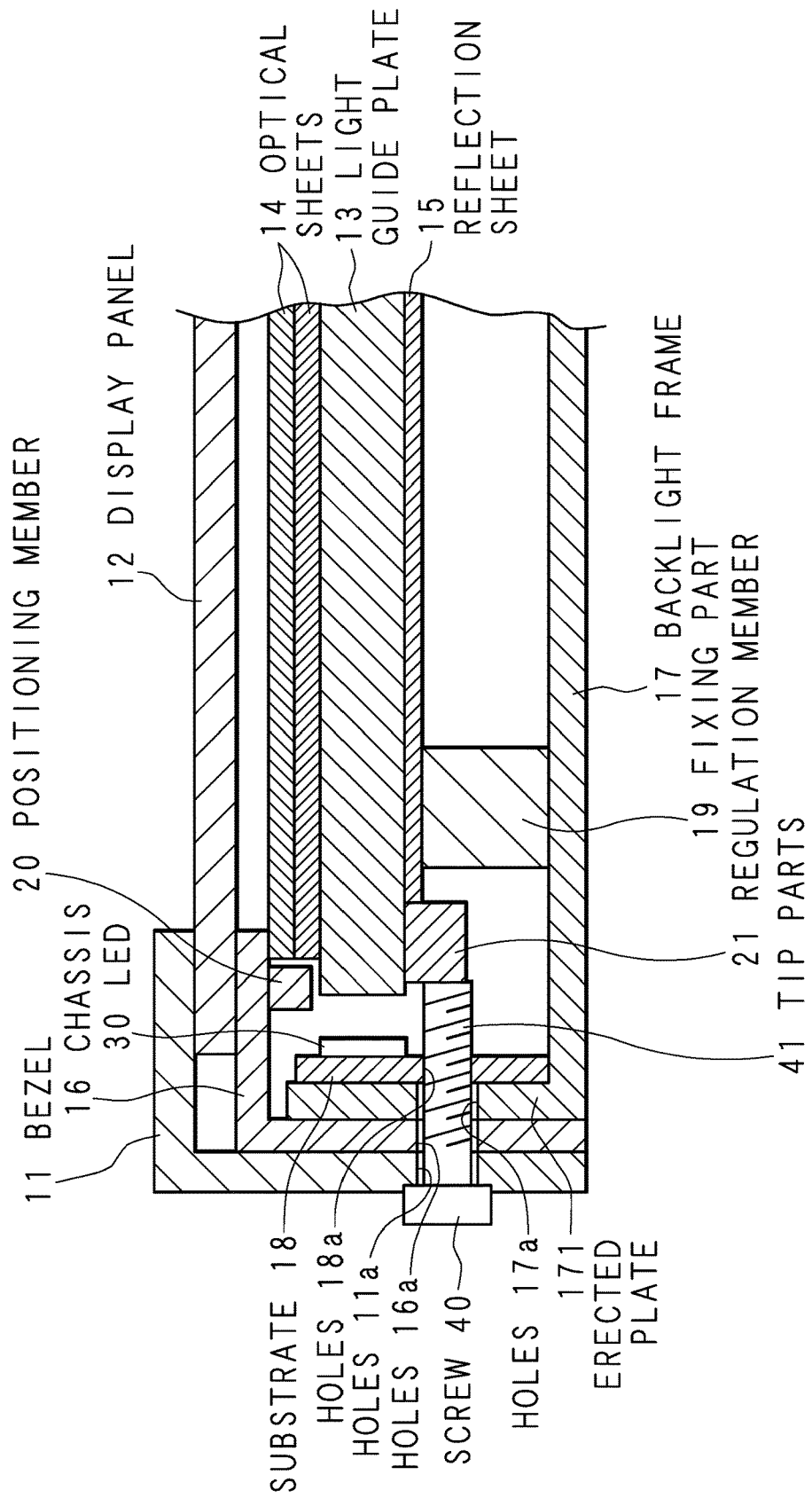
FIG. 7 is a cross-sectional view illustrating main components of a display apparatus of Embodiment 4.

FIG. 7 is a cross-sectional view illustrating main components of a display apparatus 130 of Embodiment 4. The difference from Embodiment 2 is using the substrate 18 of Embodiment 3 illustrated in FIG. 6, and including a regulation member 21. The regulation member 21 is provided in accordance with the position of the screw 40 at the rear surface of the light guide plate 13. The regulation member 21 abuts the tip part 41 of the screw 40, such that the thermal expansion of the light guide plate 13 may be regulated to prevent the LED 30 from being damaged or destroyed due to it contacting the end face 131 of the light guide plate 13.

Embodiment 5

Figure 8:
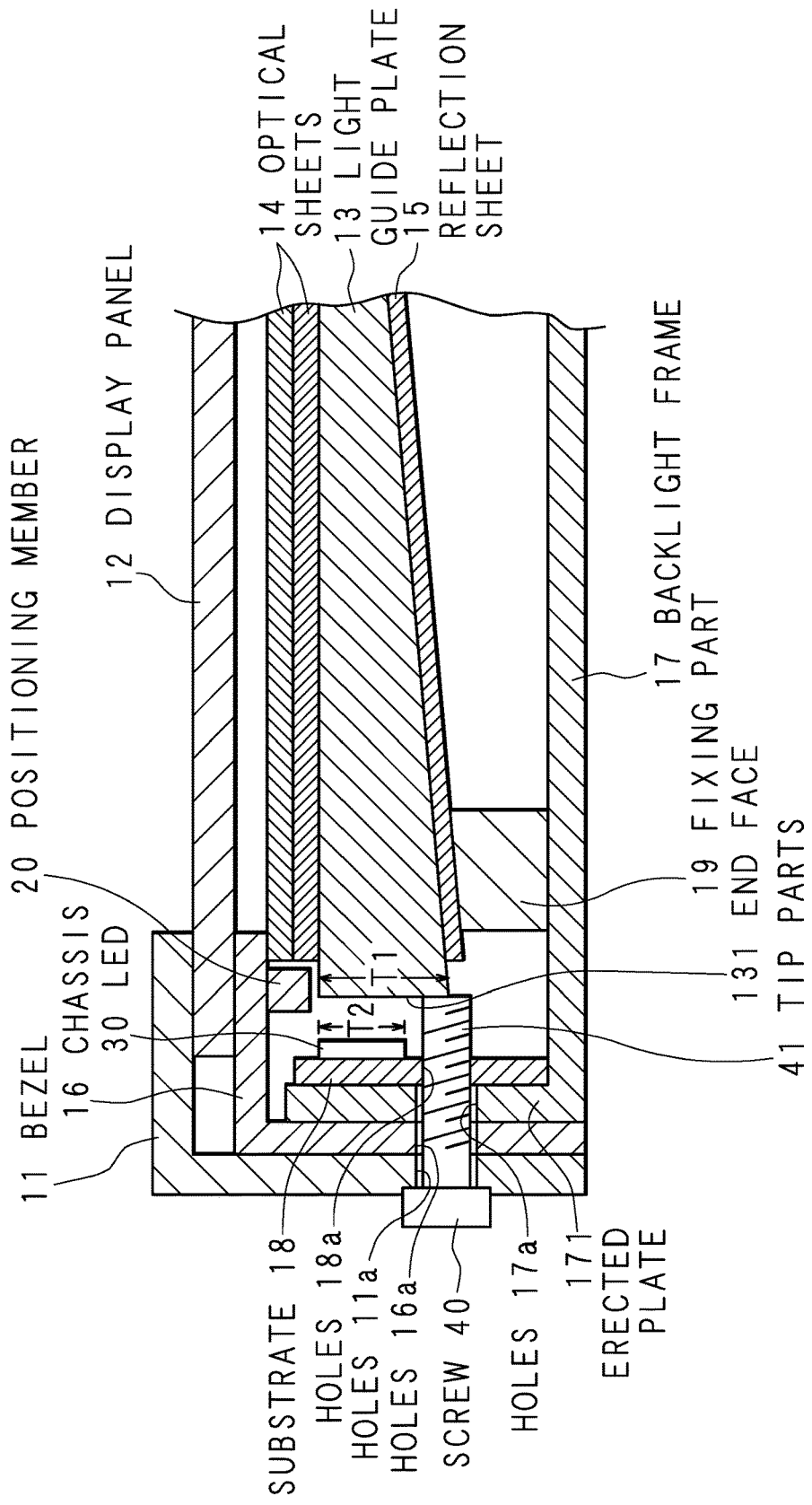
FIG. 8 is a cross-sectional view illustrating main components of a display apparatus of Embodiment 5.

FIG. 8 is a cross-sectional view illustrating main components of a display apparatus 140 of Embodiment 5. The difference from Embodiment 3 is that the display apparatus includes a so-called wedge-shaped light guide plate in which the light guide plate 13 has a thickness dimension gradually decreased toward a central part from the end face 131 thereof. As similar to Embodiment 3, when the thickness dimension of the light guide plate 13 at the end face 131 thereof (a dimension illustrated by a symbol T1 in FIG. 8) is larger than the length dimension of the LED 30 (a dimension illustrated by a symbol T2 in FIG. 8, which is the dimension of light guide plate 13 in the thickness direction thereof) (T2>T1), the lower part of the end face 131 of the light guide plate 13 abuts the tip part 41 of the screw 40, such that the thermal expansion of the light guide plate 13 may be regulated to prevent the LED 30 from being damaged or destroyed due to it contacting the end face 131 of the light guide plate 13.

In addition, the insertion holes 18a are arranged in parallel to the LEDs 30, and thereby it is possible to achieve a desired arrangement of the LEDs 30, without limiting an interval between the LEDs 30 by the presence of the insertion holes 18a.

Embodiment 6

FIG. 9 is a plan view illustrating an example of a configuration of a substrate 18 of Embodiment 6. The difference from Embodiment 1 is that, when a plurality of substrates 18 are arranged and disposed to face the end face 131 of the light guide plate 13, a semi-circular hole is formed in the end portions of the adjacent substrates 18, and by abutting or approaching the end portions of the adjacent substrates 18, a circular insertion hole 18a is formed. Since the screw 40 is configured so that the tip part 41 thereof is inserted into the insertion hole 18a of the substrates 18, when employing a so-called thin and narrow frame structure having a small dimension between the LED 30 and the bezel 11, it is possible to prevent the screw 40 from being interfered with the substrates 18. In addition, since the interference between the screw 40 and the substrates 18 can be prevented, it is possible to fix the bezel 11 and the backlight frame 17 to each other, and narrow the frame. In addition, only by forming the semi-circular hole in the substrates 18, a mounting density of the LEDs 30 on the substrates 18 is not decreased.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus comprising:
    a display panel having a display surface on one surface thereof,
    a light guide plate disposed on the other surface side of the display panel,
    a frame disposed to face a surface of the light guide plate,
    an erected plate which is erected by bending a peripheral edge part of the frame in a substantially L shape,
    a chassis having a substantially L shape cross-section provided on an outer surface of the erected plate,
    a bezel having a substantially L shape cross-section disposed to cover the erected plate through the chassis, and
    a substrate on which a plurality of light source elements disposed to face an end face of the light guide plate and provided on an inner surface of the erected plate, wherein
    the substrate, the erected plate, the chassis and the bezel have a hole which is formed at position facing the end face of the light guide plate, the hole is drilled so as to make a hole axis coincide and the hole axis has a direction toward the end face of the light guide plate, further comprising
    a screw or a clip, wherein
    a tip part of the screw or the clip is inserted into the hole in each of the substrate, the erected plate, the chassis and the bezel, and
    the substrate comprises a plurality of substrates disposed to face the end face of the light guide plate, and the hole is formed in abutted end portions of adjacent substrates.

2. The display apparatus according to claim 1, wherein the tip part is disposed between the insertion hole and the end face of the light guide plate.

3. The display apparatus according to claim 1, wherein the tip part abuts the end face of the light guide plate.

4. The display apparatus according to claim 1, wherein a protruding dimension of the tip part from one surface of the substrate is longer than a height dimension of the light source element from the one surface.

5. The display apparatus according to claim 1, wherein the plurality of light source elements are arranged side by side, and
    the hole is disposed on a virtual line segment connecting the light source elements.

6. A television receiving apparatus comprising:
    the display apparatus according to claim 1; and
    a receiving unit configured to receive a signal of television broadcasts,
    wherein the display apparatus is configured to display an image thereon based on the signal of television broadcasts received by the receiving unit.

7. The display apparatus according to claim 1, wherein the plurality of light source elements are arranged side by side, and
    the hole is disposed on a virtual line segment parallel to the light source elements.

* * * * *

UNITED STATES PATENT AND TRADEMARK OFFICE
CERTIFICATE OF CORRECTION

PATENT NO. : 10,185,081 B2
APPLICATION NO. : 14/896766
DATED : January 22, 2019
INVENTOR(S) : Ryota Kobayashi Page 1 of 1

It is certified that error appears in the above-identified patent and that said Letters Patent is hereby corrected as shown below:

In the Claims

Please delete "insertion" in Claim 2 (Column 8, Line 39).

Signed and Sealed this
Second Day of July, 2019

Andrei Iancu
*Director of the United States Patent and Trademark Office*